United States Patent [19]

Berquist

[11] Patent Number: 4,884,904

[45] Date of Patent: Dec. 5, 1989

[54] BAR CODE PRINTER

[75] Inventor: John F. Berquist, Atascadero, Calif.

[73] Assignee: Cognitive Solutions, Inc., Atascadero, Calif.

[21] Appl. No.: 131,406

[22] Filed: Dec. 9, 1987

[51] Int. Cl.[4] ............................................. B41J 3/20
[52] U.S. Cl. ............................... 400/120; 346/76 PH; 219/216
[58] Field of Search .................. 400/120; 346/76 PH; 219/216

[56] References Cited

U.S. PATENT DOCUMENTS

| | | | |
|---|---|---|---|
| 4,235,555 | 11/1980 | Aprato | 400/120 |
| 4,401,391 | 8/1983 | Kawai et al. | 400/120 |
| 4,507,666 | 3/1985 | Kondo et al. | 346/76 PH |
| 4,531,851 | 7/1985 | Kondo et al. | 400/120 X |
| 4,560,292 | 12/1985 | Takahashi | 400/120 X |

Primary Examiner—Edgar S. Burr
Assistant Examiner—James R. McDaniel
Attorney, Agent, or Firm—Fleit, Jacobson, Cohn, Price, Holman & Stern

[57] ABSTRACT

A thermal printhead fixed to a pivotal supporting frame is held in operative printing contact with a web of printing medium backed by a platen roller under the bias of a spring device engageable with the pivotal supporting frame for the printhead. The spring device is operatively located relative to the platen roller so that the spring bias exerted establishes proper frictional feeding engagement between the web and the roller which is power driven. The spring device, the pivotal supporting frame for the printhead and the platen roller are mounted by a common housing section.

3 Claims, 2 Drawing Sheets

BAR CODE PRINTER

BACKGROUND OF THE INVENTION

This invention relates generally to a label printing device and more particularly to a thermal printhead device for printing bar codes r the like on a web type of printing medium.

Printing devices which feature a thermal print head having electrically heated elements embedded therein to print data on a web of material withdrawn from a storage roll, are generally well known as disclosed for example in U.S. Pat. Nos. 3,409,902, 4,119,974, 4,145,698, 4,151,397, 4,228,441, 4,342,040, 4,376,942 and 4,507,666. In most of such prior printers, the thermal printhead is pressed under a spring bias against a printing medium backed by a platen. Also, in many of such thermal printhead devices, the platen is a roller over which the web printing medium is entrained.

Various supporting arrangements for the thermal printhead are disclosed in the foregoing patents. According to the disclosure in U.S. Pat. No. 4,507,666 to Kondo et al, aforementioned, the printhead is mounted on a pivotal frame journaled on an axis fixed to the printer body. Means for adjusting the angular orientation between the pivotal frame and the printhead carried thereon is provided in order to establish proper contact with a web backed by a roller type of platen. Feeding of the web according to the Kondo et al patent is effected by powered drive of the platen roller. Toward that end, an auxiliary roller mounted on the supporting frame holds the web in frictional drive engagement with the platen roller at a location angularly spaced from the location at which printing contact is established with the printhead. In view of the arrangement disclosed in the Kondo et al patent as well as the arrangements disclosed in the other aforementioned patents, spring bias adjustment is required to establish and maintain the proper printing contact between the thermal printhead and the platen backed web separately from the frictional drive engagement between the web and platen. Also, separate web feeding arrangements are required for previously available printers as disclosed for example in the aforementioned patents.

It is therefore an important object of the present invention to provide a portable and relatively simple printing apparatus of the thermal printhead type which is operationally reliable, without adjustment, for printing data such as bar code labels on a web type sheet of material that is fed between printing operations.

It is a further object in accordance with the foregoing object to provide a thermal printhead type of printer having a powered feed roller which acts as a platen backing the web maintained in proper contact with the thermal printhead without adjustment.

It is yet another object of the present invention to provide a thermal printhead type of printing device operatively mounted and supported by a printhead body construction that is relatively economical to manufacture and which provides easy access for servicing and maintenance purposes.

SUMMARY OF THE INVENTION

In accordance with the present invention, a thermal printhead is non-adjustably mounted on a pivotal frame in operative relationship to a platen roller over which a web is entrained. The platen is a web feeding roller directly power driven for feeding of the web between printing operations. The printhead supporting frame includes a mounting block having a planar surface to which the thermal printhead is fixedly secured. A cover secured to the mounting block protectively shields the thermal printhead leaving exposed a portion thereof at one end of the block for contact with the web. A spring pressure applying device fixedly mounted by the printer body in overlapping relation to the aforementioned end of the mounting block applies a spring force which is transmitted to the end portion of the thermal printhead in contact with the web. The spring pressure device is so located with respect to the printhead supporting frame and the roller platen as to maintain proper printing contact as well as feeding friction between the web and the platen roller without adjustment.

Support for the platen roller, the pivotal supporting frame and the spring pressure device is provided by a common top housing section of the printer body which is of a one-piece construction according to one embodiment of the invention. Such housing section includes an intermediate recess portion from which the web extends. The platen roller underlying the web is rotatably supported at opposite axial ends thereof by bearings within end bearing portions of the top housing section. A powered drive assembly connected to the feed roller is mounted within one of the end bearing portions of the top housing section while the spring pressure device is mounted by a bar secured to the tops of the end bearing portions of the housing section bridging the intermediate recessed portion. The top housing section is adapted to be removably secured to a base portion of the printer body. A circuit board with the electrical components controlling and powering operation of the printer is mounted between the top housing section and the base, thereby providing easy access to both the electrical and mechanical components of the printer for servicing and maintenance purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF THE PREFERRED EMBODIMENT

Figure 1:
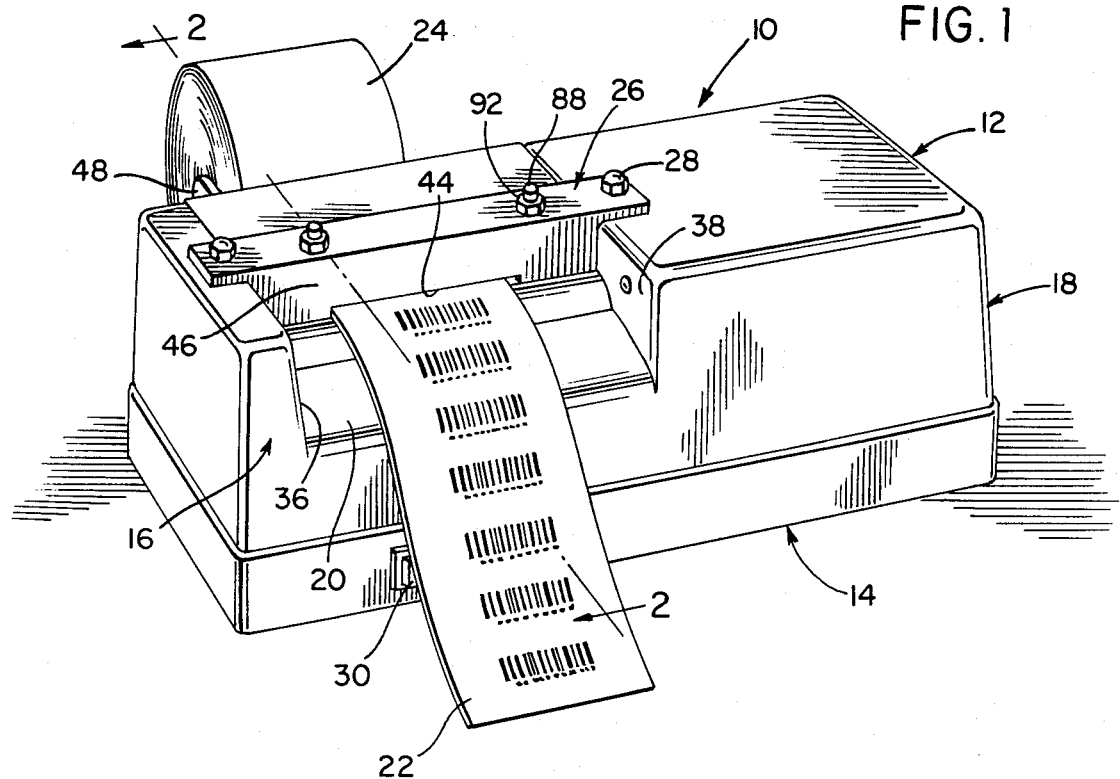
FIG. 1 is a perspective view of a bar code printer constructed in accordance with one embodiment of the present invention.

Referring now to the drawings in detail, FIG. 1 illustrates a code bar printer in accordance with one embodiment of the invention generally referred to by reference numeral 10. All components of the printer are mounted or supported by a body which is formed by a top housing section 12 removably secured to a bottom base 14. The top housing section includes an end bearing portion 16 longitudinally spaced from an end bearing portion 18 of greater longitudinal length. The end bearing portions 16 and 18 of the housing section 12 are interconnected by a recessed intermediate portion 20 through which the printing medium in the form of a flexible web of sheet material 22 projects forwardly as shown. The web 22 is withdrawn from a storage roll 24 adapted to be mounted in rearwardly spaced relationship to the rear wall of the top housing section 12. A spring pressure mechanism generally referred to by reference numeral 26 is mounted by a pair of fasteners 28 on the top of the end bearing portions 16 and 18 of the housing section, bridging the intermediate recess portion 20. The spring device 26 exerts biasing forces essential to the proper operation of the printer as will be explained hereinafter in detail. A feed control switch 30 may be mounted on the front of the base 14 to control feeding of the web as will also be explained hereinafter.

Figure 2:
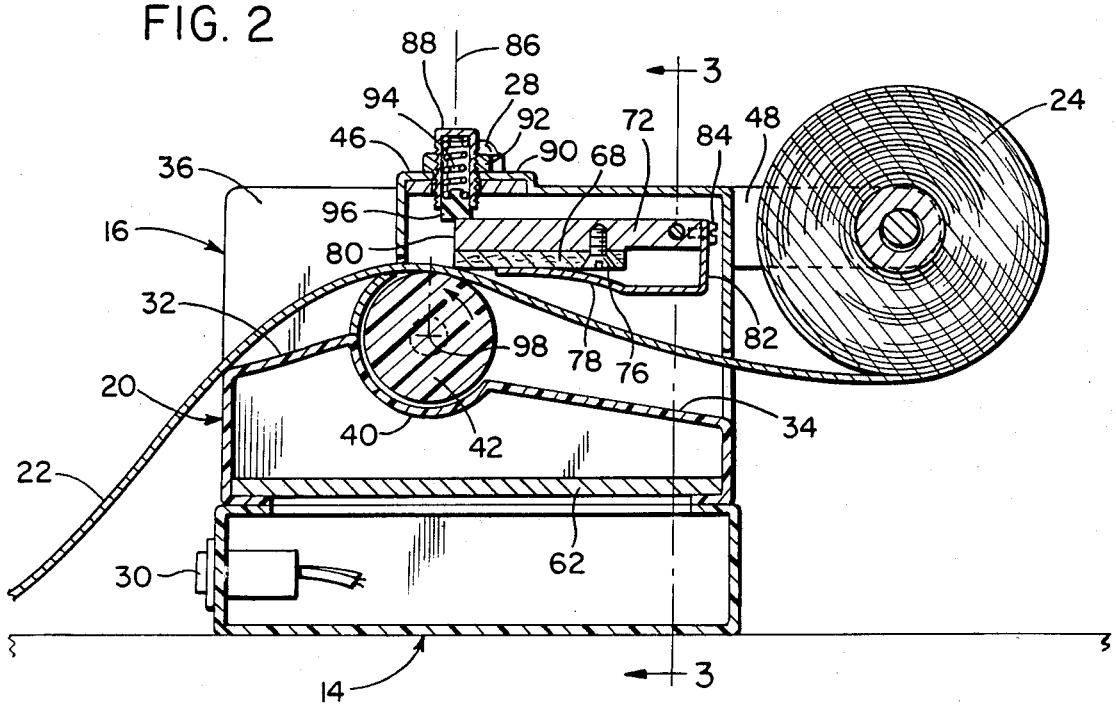
FIG. 2 is a side section view of the printer taken substantially through a plane indicated by section line 2—2 in FIG. 1.
Figure 3:
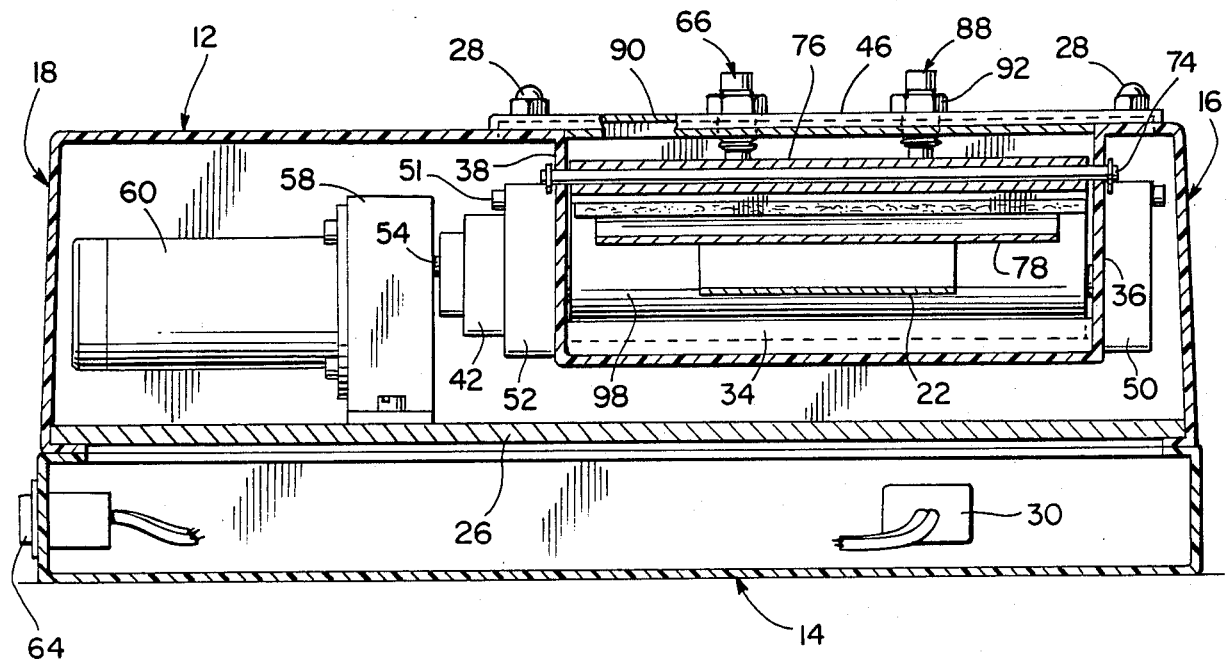
FIG. 3 is a section view taken substantially through a plane indicated by section line 3—3 in FIG. 2.

Referring now to FIGS. 2 and 3 in particular, the intermediate portion 20 of the top housing section includes downwardly diverging wall portions 32 and 34 which extend at substantially right angles to confronting end walls 36 and 38 on the end bearing portions 16 and 18 of the housing section. The diverging wall portions 32 and 34 are interconnected by a downwardly extending, arcuate wall portion 40 closely spaced below a cylindrical platen roller 42 in contact with the underside of the web 22 spaced above the wall portions 32, 40 and 34 between the end walls 36 and 38 of the end bearing portions. The web 22 projects through an opening 44 in a cover 46 associated with the spring pressure device 26 aforementioned. The storage roll 24 from which the web 22 is withdrawn, may be mounted between parallel spaced arms 48 projecting from the cover 46, as shown in FIGS. 1 and 2.

As more clearly seen in FIG. 3, opposite axial end portions of the platen roller 42 are rotatably supported for rotation about a rotational axis fixed to the housing section 12 by means of bearing assemblies 50 and 52 respectively secured to the end walls 36 and 38 of the end bearing portions by means of fasteners 51. The left end portion of the platen roller 42 as viewed in FIG. 3, projects beyond the bearing assembly 52 for connection to the output shaft 54 of a reduction gear unit 56 associated with an electric drive motor 60 to form a powered drive assembly mounted within the end bearing portion 18 of the housing section. The powered drive assembly may be positioned on or secured to a printed circuit board 62 supported by the housing section 12 of the printer body to partition its interior from the enclosure within the base portion 14 within which other electrical components may be located including the electrical connections to the feed switch 30 aforementioned and to an on/off power switch 64 as shown in FIG. 3.

With continued reference to FIGS. 2 and 3, a pivotal support frame generally referred to by reference numeral 66 mounts a thermal printhead 68 for limited pivotal displacement under the spring bias of the spring pressure device 26, aforementioned, in order to frictionally maintain the web 22 in feeding contact with the platen roller 42 at one location thereon as well as to establish proper printing contact with the web overlying the same location on the platen roller. The thermal printhead 68 is of well known construction and is fixedly secured to a planar surface 70 on a mounting block 72 associated with the pivotal supporting frame 66. The mounting block 72 as shown in FIG. 3, is provided with pivot shaft 74 projecting laterally therefrom adjacent one longitudinal end of the block into openings in the confronting end walls 36 and 38 of the end bearing portions 16 and 18 of the housing section 12. The mounting block 72 is thereby pivotally displaceable about an axis extending through the shaft 74. Any pivotal movement of the mounting block 72 is transmitted to the thermal printhead 68 rigidly secured to the planar surface 70 by means of fasteners 76 as shown in FIG. 2. Most of the printhead 68 is protectively shielded by a cover 78 which contacts the printhead in spaced adjacency to one end 80 of the mounting block 72 remote from the opposite end 81 adjacent to which the pivot shafts 74 project, as aforementioned. A right angle end portion 82 of the shield 78 secures it by means of fasteners 84 to the end 81 of the mounting block 72 as shown in FIG. 2. Thus, only one end portion of the printhead 68 is exposed for printing contact with the web 22 at the end 80 of the mounting block 72.

The end 80 of the mounting block 72 is aligned with the axes 86 of a pair of tubular members 88 associated with the spring device 26. The tubular members 88 are fixed to a common spring mounting bar 90 by means of locknuts 92, the mounting bar 90 being secured by the fasteners 28 to the tops of the end bearing portions 16 and 18. Coil springs 94 as shown in FIG. 2, are enclosed within the tubular members 88 and exert an axial bias on the mounting block 72 of the pivotal frame 66 along the axes 86 through pressure pads 96. The axial spring forces exerted by the coil springs 94 are predetermined prior to assembly and installation of the spring pressure device 26 in order to exert the desired spring bias for establishing both the proper printing contact between the printhead 68 and the web 22 and the proper frictional feeding engagement between the web 22 and the platen roller 42. Further, the end 80 of the pivotal mounting block 72 in alignment with the coil spring axes 86 will be operatively located relative to the rotational axis 98 of the platen roller 42, as shown in FIG. 2, in order to establish and maintain the aforesaid proper printing contact and frictional feed engagement.

Figure 4:
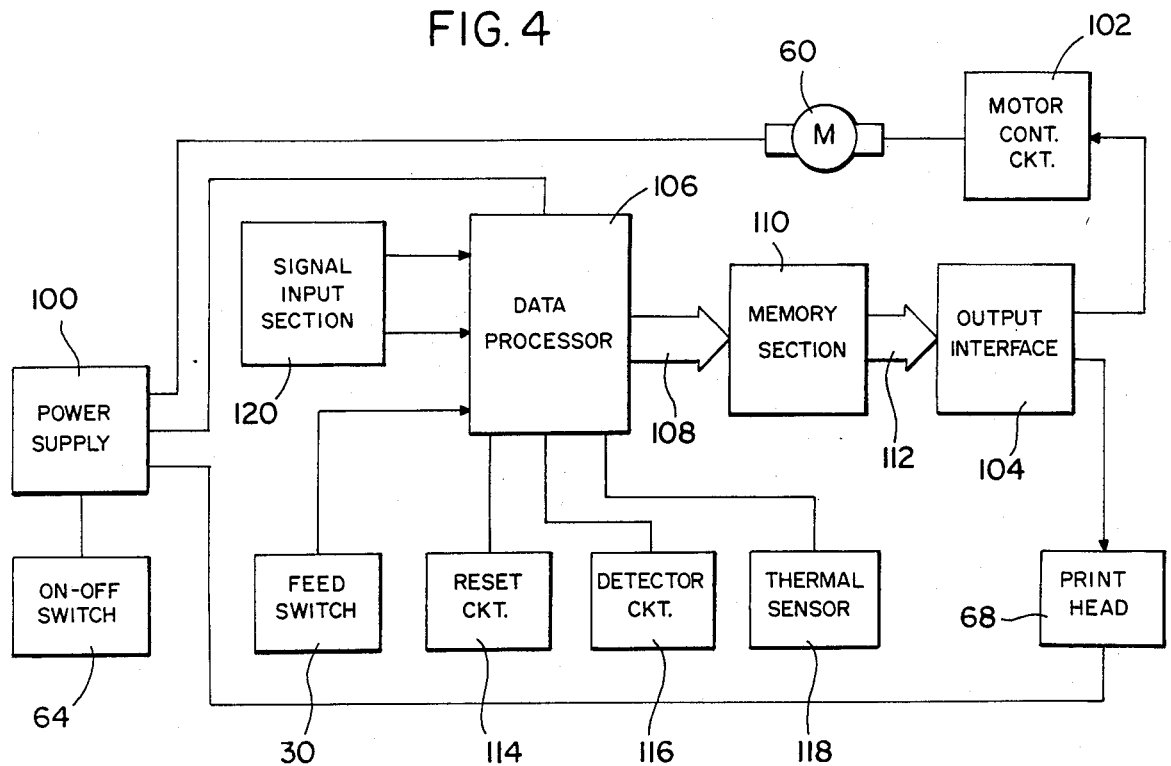
FIG. 4 is a simplified block diagram illustrating the powering and control system for the printer.

The electrical components associated with the printer and mounted on the circuit board 62, are diagrammed in FIG. 4 which shows a power supply 100 connected to the on/off switch 64 aforementioned. The power supply is connected to the drive motor 60 aforementioned which in turn is controlled through a motor control circuit 102 to which operating signals are supplied through an output interface 104 from which operational control is also exercised over the printhead 68 connected to the power supply. Feeding movement of the web is effected by energization of the drive motor 60 between printing operations in response to actuation of the feed switch 30 connected as one of the inputs to a data processor 106. The outputs of the data processor are fed through bus 108 to a memory section 110 from which readout of control signals is applied by bus 112 to the output interface 104. Printing operations are under control of reset circuit 114, detector circuit 116 and thermal sensor 118 connected to the data processor 106 in a manner generally known in the art. The data printout through the printhead 68, on the other hand, is dependent on input data fed to the data processor 106 from a signal input section 120 in a manner also generally known in the art.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a thermal printer having a mounting body, a feeding platen rotatably mounted by the body, a printhead and supporting means for positioning the printhead in printing contact with a printing medium at a contact location backed by the platen under a spring bias, said supporting means including a support frame on which the printhead is carried in fixed relation thereto and spring means mounted by the body in operative engagement with the support frame for applying said spring bias only to said contact location at which frictional feed engagement between the printing medium and the platen is established, said support frame including a rigid element having opposite end portions, pivot means on the element adjacent one of the end portions thereof for pivotal mounting thereof by the body, and a carrying portion on the element extending to the other of the end portions thereof on which the printhead is fixedly mounted; means mounting the spring means on the body in overlapping relation to the element at said other of the end portions, said spring bias being transmitted through the element to the printhead at said other of the end portions; and said body comprising a housing section exclusively mounting the platen, the spring means and the supporting means, and a base to which said housing section is secured, housing section having an intermediate recessed portion through which said web extends and opposite end bearing portions within which the platen is rotatably supported, said spring mounting means being secured to the end bearing portions bridging the intermediate recessed portion.

2. The combination of claim 1 including a powered drive assembly connected to the platen within one of said end bearing portions of the housing section 3. The combination of claim 1 wherein said support frame further includes shield means mounted on the element for limiting exposure of the printhead adjacent to said other of the end portions thereof at which said contact of the printhead with the printing medium at said contact location on the platen is established.

* * * * *